United States Patent [19]

Lageder et al.

[11] Patent Number: 4,774,876

[45] Date of Patent: Oct. 4, 1988

[54] SPRUNG SUSPENSION OF AN ACTUATING PISTON

[75] Inventors: Heinrich Lageder, Würenlingen; Kamil Prochazka, Windisch, both of Switzerland

[73] Assignee: BBC Brown, Boveri Ltd., Baden, Switzerland

[21] Appl. No.: 13,892

[22] Filed: Feb. 11, 1987

[30] Foreign Application Priority Data

Feb. 26, 1986 [DE] Fed. Rep. of Germany ....... 3606148

[51] Int. Cl.$^4$ .................................................. F16D 3/16
[52] U.S. Cl. .................................. 92/130 A; 251/337; 403/58; 403/121
[58] Field of Search ............. 92/130 A; 251/61, 61.3, 251/61.4, 61.5, 62, 63.4, 63.5, 63.6, 337; 267/170; 123/90.28, 90.67, 188 SA, 188 SB, 188 SC; 403/58, 121

[56] References Cited

U.S. PATENT DOCUMENTS

| | | | |
|---|---|---|---|
| 851,182 | 4/1907 | Rowbotham | 251/337 X |
| 979,068 | 12/1910 | Gibbs | 123/188 SB |
| 1,960,709 | 5/1934 | Olenick | 123/90.67 |
| 2,841,128 | 7/1958 | Aiken | 123/90.67 |
| 3,379,405 | 4/1968 | Natho | 251/63.6 X |
| 3,563,619 | 2/1971 | Evans | 308/15 |
| 3,890,943 | 6/1975 | Schönlau et al. | 123/90.28 X |
| 4,354,425 | 10/1982 | Bruton et al. | 251/61.4 X |
| 4,597,408 | 7/1986 | Canter | 123/90.67 X |

FOREIGN PATENT DOCUMENTS

| | | |
|---|---|---|
| 0103549 | 3/1984 | European Pat. Off. . |
| 664406 | 8/1938 | Fed. Rep. of Germany . |
| 8204378.7 | 7/1983 | Fed. Rep. of Germany . |
| 2052638 | 1/1981 | United Kingdom . |
| 2133472 | 7/1984 | United Kingdom . |
| 2141176 | 12/1984 | United Kingdom . |

*Primary Examiner*—John Rivell
*Attorney, Agent, or Firm*—Burns, Doane, Swecker & Mathis

[57] ABSTRACT

In a spring suspension of an actuating piston, essentially consisting of a spring plate, a control spring acting on the spring plate and a nut as connection between actuating piston and spring plate, an intermediate underlay (5) is arranged between spring plate (2) and nut (4). The supporting surfaces of the intermediate underlay (5) with respect to the spring plate (2) and the nut (4) are formed by several mutually offset rolling elements (6a, 6b).

4 Claims, 1 Drawing Sheet

SPRUNG SUSPENSION OF AN ACTUATING PISTON

FIELD OF THE INVENTION

The present invention relates to a spring suspension of an actuating piston.

BACKGROUND OF THE INVENTION

Actuating pistons which serve in hydraulic systems for the transmission of a stroke movement are subjected to a pretension, which is usually generated by a spring.

This ensures that the information arriving at the actuating or control piston, which is aimed at effecting a change in the stroke position, is processed without delay and without falsification.

The disadvantages of such a design are to be seen in that, when there is a deformation of the control spring, the upper spring pad on the spring plate side no longer remains parallel to the lower pad. The resultant friction between the spring plate and the nut serving as connecting element between spring plate and actuating piston may mean that the control spring cannot adjust unassisted at its spring plate end due to the new position resulting from the spring deformation (spring travel):

The spring "sticks". The friction torque generates a radial force in the guide of the actuating piston, which has an adverse effect on the intended delay-free and unfalsified change in the stroke position of the actuating piston.

OBJECTS AND SUMMARY OF THE DISCLOSURE

This is where the invention wants to provide a remedy. The invention, as is characterized in the claims, is based on the object of ensuring with a spring suspension of an actuating piston a change in the stroke position of the actuating piston which is free from delay and true to the information supplied.

The essential advantage of the invention is to be seen in that the rolling means integrated into the intermediate underlay enable both the spring plate and the nut to roll independently of each other in the sense of a spherical or universal see-saw motion. This means that the radial force exerted on the guide of the actuating piston by the "sticking" of the spring is countered by the now spheroidal see-saw motion of the spring plate relative to the actuating piston.

BRIEF DESCRIPTION OF THE DRAWING

An exemplary embodiment of the invention is outlined below with reference to the drawing, in which.

All elements unnecessary for direct understanding of the invention have been omitted.

DETAILED DESCRIPTION OF A PREFERRED EMBODIMENT

Figure 1:
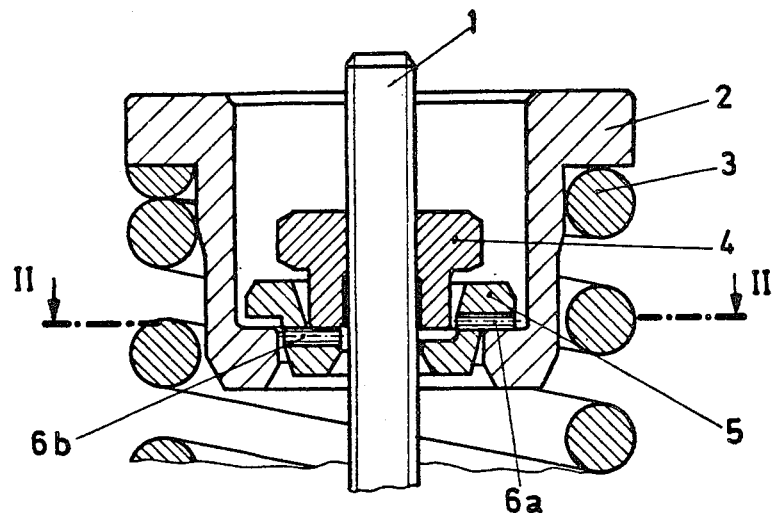
FIG. 1 is a partial cross-sectional view through the spring suspension of the actuating piston along the line of intersection I—I from FIG. 2.
Figure 2:
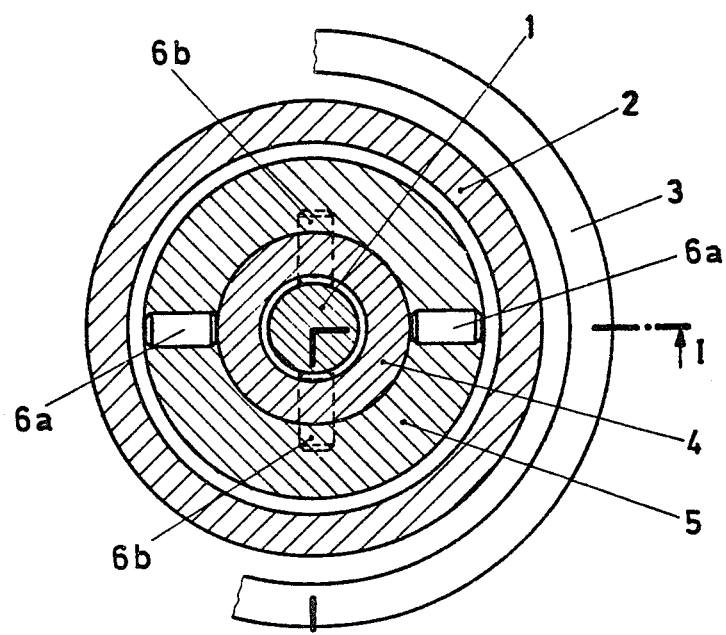
FIG. 2 is a cross-sectional view of the spring suspension along the line of intersection II—II from FIG. 1.

FIG. 1 is a partial cross-sectional view of a spring suspension of an actuating piston. The sectional plane is, as depicted in FIG. 2, a 90° view. Consequently, it is possible to illustrate the position of the pairs of cylindrical rollers 6a and 6b. The actuating piston 1 is provided with a thread at its top end. Further below, the shaft is designed as a lifting piston. The spring plate 2 is hollowed on the inside and offers space there for the nut 4 and the intermediate underlay 5. On the outside, the spring plate 2 is provided with a collar, there the top end of the control spring 3 can press against it and the neck there of the spring plate 2 is used for lateral guidance of the control spring 3.

As is apparent from FIG. 2, the spherical or universal see-saw motion is produced by two cylindrical rollers 6a, 6b in each case which are arranged in diametrically opposed pairs and, as can be seen once again in FIG. 1, are integrated into the intermediate underlay 5, distributed over different horizontal planes. The cylindrical rollers 6a lie on the inside collar of the spring plate 2, the cylindrical rollers 6b on the other hand are arranged further down. They lie between spring plate 2 and actuating piston 1 and protrude at the top freely out of their guide in the intermediate underlay 5. This makes it possible for the nut 4 to support itself thereupon. Such a bearing means that the spring plate 2 can adjust in accordance with the lateral vector acting on the control spring 3, without affecting the actuating piston 1, the movement involved here being virtually frictionless thanks to the cylindrical rollers 6a, 6b.

While this invention has been illustrated and described in accordance with a preferred embodiment, it is recognized that variations and changes may be made and equivalents employed herein without departing from the invention as set forth in the claims.

What is claimed is:

1. A spring suspension of a control piston comprising:
   a spring plate;
   a control spring acting on the control piston indirectly through the spring plate;
   connection means between the spring plate and the control piston for connecting the spring plate with the control piston at a point along the length of the control piston; and
   movement permitting means for permitting universal movement of the connection means about the point to permit the spring plate to move about the point relative to the control piston by overcoming rolling friction in the movement permitting means.

2. The spring suspension as claimed in claim 1, wherein the rolling friction in the movement permitting means is created by two pairs of cylindrical rollers offset from each other by 90°.

3. The spring suspension as claimed in claim 1, wherein the movement permitting means includes a first pair of coaxial rollers extending in a first direction perpendicular to the length of the control piston and a second pair of coaxial rollers extending in a second direction perpendicular to the length of the control piston and offset from the first direction by 90°.

4. The spring suspension as claimed in claim 3, wherein the first pair of rollers is displaced from the second pair of rollers along the length of the control piston.

* * * * *